Figure 8:
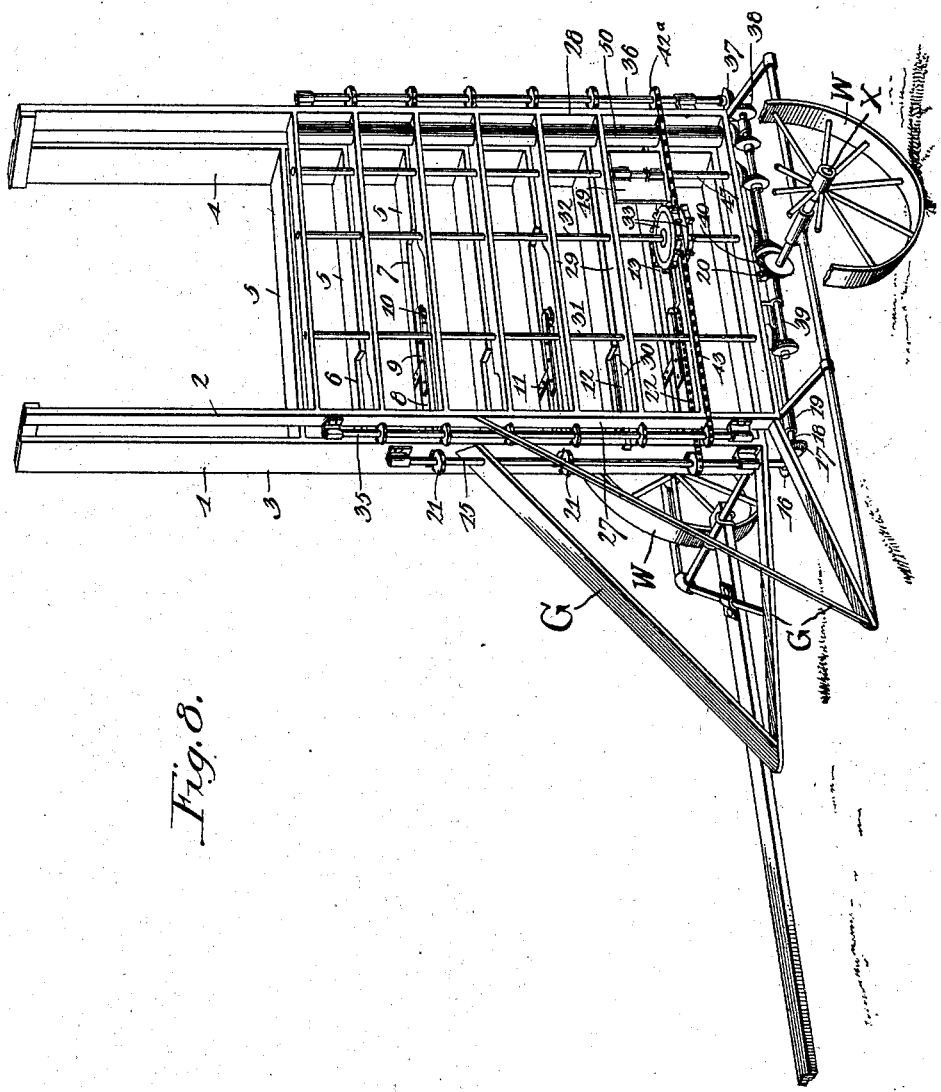

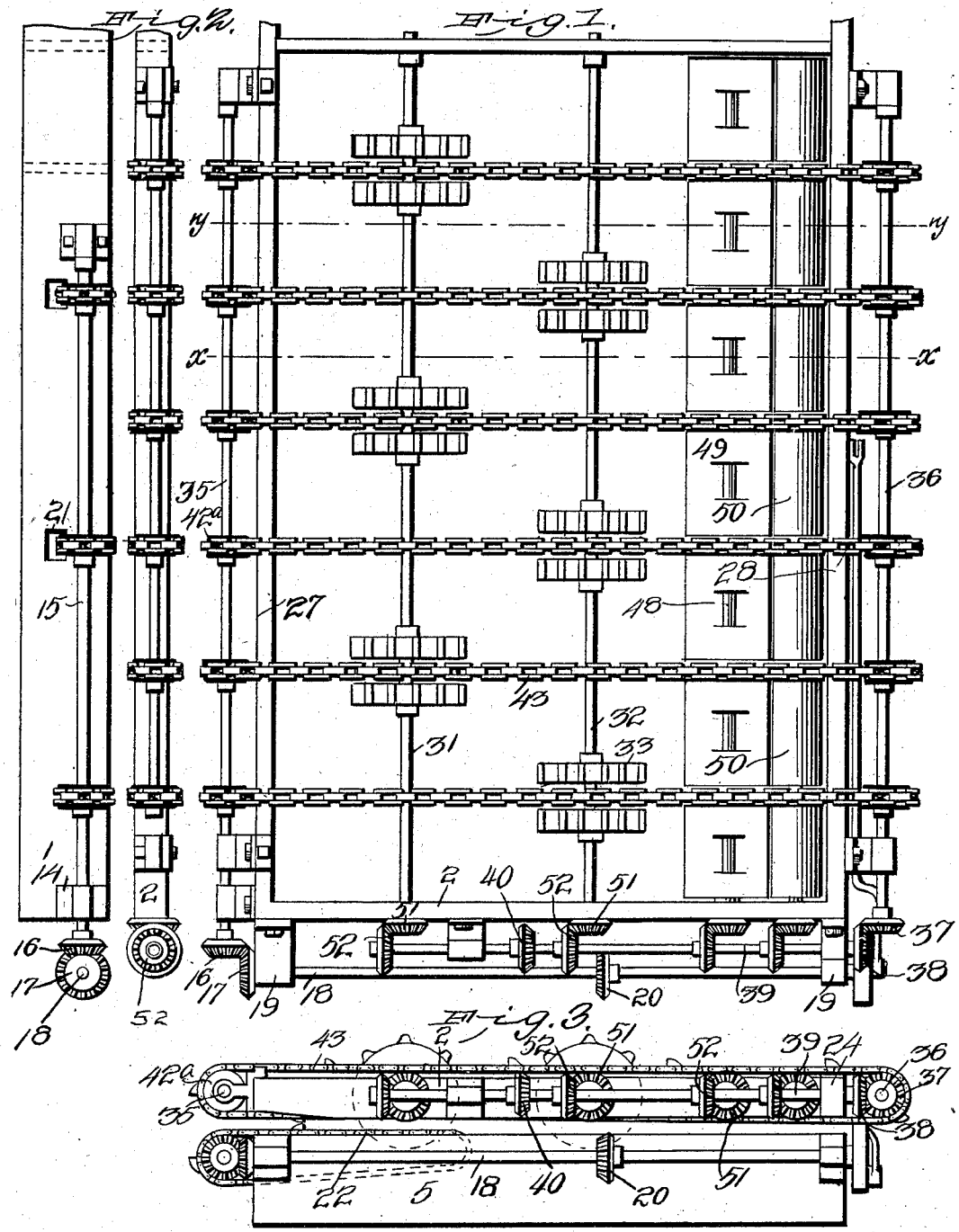

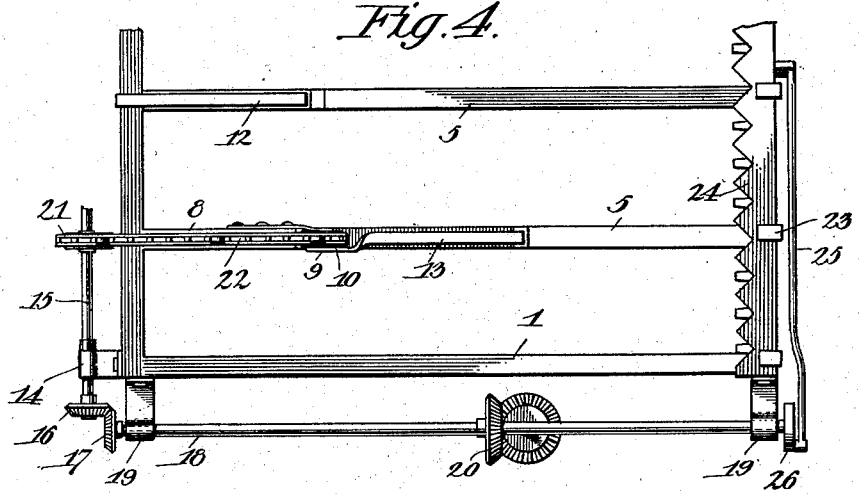
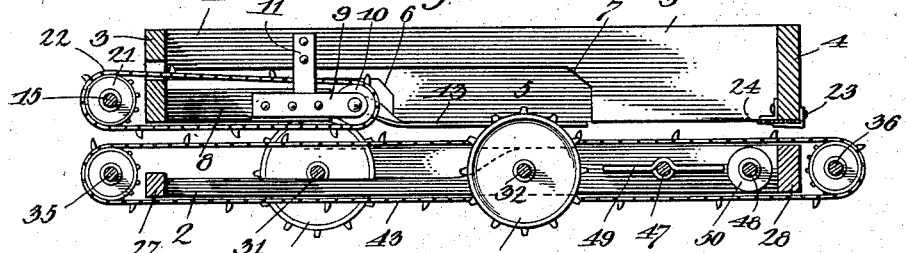
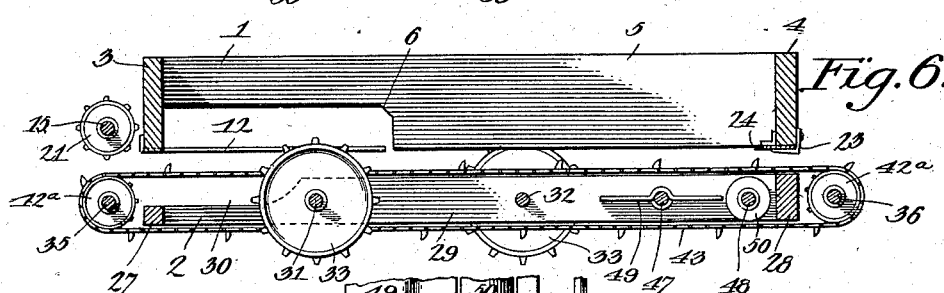
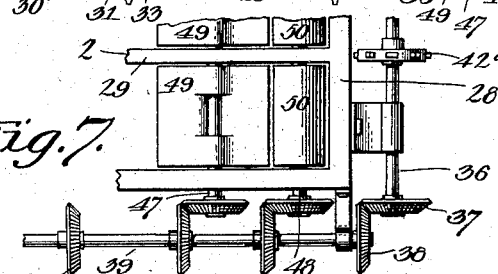

No. 729,610. PATENTED JUNE 2, 1903.
J. P. LAMASNEY.
EAR STRIPPING DEVICE FOR CORN HARVESTERS.
APPLICATION FILED JULY 3, 1902.
NO MODEL. 3 SHEETS—SHEET 3.

Witnesses J. P. Lamasney, Inventor.
by C. A. Snow & Co.
Attorneys

No. 729,610. Patented June 2, 1903.

UNITED STATES PATENT OFFICE.

JOHN PIERCE LAMASNEY, OF GARDNER, KANSAS.

EAR-STRIPPING DEVICE FOR CORN-HARVESTERS.

SPECIFICATION forming part of Letters Patent No. 729,610, dated June 2, 1903.

Application filed July 3, 1902. Serial No. 114,277. (No model.)

*To all whom it may concern:*

Be it known that I, JOHN PIERCE LAMASNEY, a citizen of the United States, residing at Gardner, in the county of Johnson and State of Kansas, have invented a new and useful Ear-Stripping Device for Corn-Harvesters, of which the following is a specification.

This invention relates to corn-harvesters; and it has particular reference to that class of machines which are used for stripping the ears of corn from stalks standing in the field and in which provision is also made for husking or shucking the ears after being thus stripped.

My present invention relates to the stripping mechanism only; and it has for its object to provide a device in which the ears of corn shall be guided to a horizontal position so as to be presented with the butt-ends to the cutting mechanism.

A further object of the invention is to so construct the frame of the machine that bent and broken stalks shall be kept out of the way.

A further object of my invention is to provide an improved construction and arrangement of the detailed parts of the machine, whereby the desired operation shall be performed effectively and with comparatively little expenditure of power.

With these and other ends in view the invention consists in the improved construction, arrangement, and combination of parts, which will be hereinafter fully described, and particularly pointed out in the claims.

In the accompanying drawings, Figure 1 is a side view showing part of a corn-harvesting machine constructed in accordance with my invention. Fig. 2 is a front view of the same. Fig. 3 is a bottom plan view. Fig. 4 is a side elevation showing the inner side of the guiding-section. Fig. 5 is a horizontal sectional view taken on the line $xx$ in Fig. 1. Fig. 6 is a horizontal sectional view taken on the line $yy$ in Fig. 1. Fig. 7 is a detail view of a portion of the lower end of the conveyer-frame, showing the arrangement of beaters and supporting-rollers and means for operating the same. Fig. 8 is a perspective view showing the parts constituting my invention mounted in position for operation, only one set of conveyer-chains and related parts being shown, this being considered sufficient to illustrate the invention.

Corresponding parts in the several figures are indicated by like characters of reference.

The frame of my improved device is composed of two principal parts or sections, which are designated, respectively, 1 and 2. These parts or sections may be described as being arranged vertically and approximately parallel to each other. The said sections are also to be mutually connected and attached to a suitable framework supported upon wheels which shall admit of the passage between said sections of the stalks from which the ears are to be stripped. The supporting-wheels are in the drawings designated W, said wheels being mounted upon stub-axles X, for which suitable boxes or bearings are provided.

I desire it to be understood that the construction of the supporting means may be varied to any extent within the scope of my invention.

The section 1, which may be described as the guiding-section, is composed mainly of two uprights or sides 3 and 4, which are connected by a series of longitudinal shelves 5. The upper ends of the side pieces have been shown broken off in the drawings, as it is not necessary that the arrangement of the longitudinal shelves should be continued beyond the point at which ears are usually found upon the stalks. The spaces between the shelves 5 constitute the guiding slots or spaces in which the ears are guided to an approximately horizontal position before being presented to the stripping mechanism, as will be hereinafter described. The shelves 5 are therefore to be arranged at a suitable distance—say about seven inches—apart in order that ample provision may be made for the thickness of the ears and the distance at which they are found apart upon the stalks. The shelves 5 are to be provided in their inner sides with slots or recesses extending from the front upright 3 in a rearward direction. These slots or recesses are of varying lengths, the shorter ones being designated 6 and the longer ones 7, the arrangement being such that the short and long slots shall alternate. Over the longer slots are extended arms or brackets 8, secured to the front upright 3 and extending in a rearward direction, the inner ends of said brackets being provided with arms 9 9, carrying rollers or sprocket-wheels 10. The said brackets 8 are also connected with the shelves 5 by means of links or braces 11, as seen in Fig. 5, whereby their position is maintained. Springs 12 are secured to the upright 3 and extended over the open slots 6 in a rearward direction, the inner rear ends of said springs being left free to move into the slots. Similar springs 13 are secured to the arms or brackets 8 and extended inwardly over the open ends of the slots 7, the free ends of said springs being free to move into said slots.

The front side 3 of the section 1 is provided with brackets 14, affording bearings for a shaft 15, having at its lower end a bevel-gear 16, meshing with a pinion 17 upon the end of the counter-shaft 18, bearings for which are provided in brackets 19 upon the under side of the section 1. The shaft 18 has a bevel-gear 20, which forms the medium through which motion is transmitted to the parts of my improved device from any suitable source of power, preferably from one of the supporting-wheels. The shaft 15 is equipped with sprocket-wheels 21, from which chains 22 pass over the rollers or sprocket-wheels 10 at the inner ends of the arms or brackets 8. These chains constitute conveyer-chains which operate, in conjunction with conveyer-chains upon the section 2, to be hereinafter described, to guide the stalks between the parts or sections of the device.

To the inner edge of the rear upright 4 of the section 1 are secured suitable bearings 23 for a vertically-reciprocating cutter-bar 24, which may be of any suitable well-known construction and which constitutes the cutting apparatus of the device. The bearings 23 may be formed upon a finger-bar; but the detailed construction of this part of my invention is unimportant and may be varied to suit individual preferences. Motion is imparted to the cutter-bar 24 through the medium of the pitman 25, having connection at its upper end with a crank-disk 26 upon the rear end of the shaft 18.

I shall now proceed to describe the part or section 2 of the device, which may be described as the conveyer-section. The frame of this section is composed of front and rear uprights 27 and 28, which are to be connected by means of braces 29, which are located, preferably, in alinement with the shelves 5 of the section 1. These braces are provided on their inner sides with recesses 30, extending from the front and in a rearward direction, said recesses being formed opposite to the slots 6 and 7 in the shelves 5 of the opposing section and somewhat shorter than the said slots. Shafts 31 and 32 are journaled vertically in the frame. Beaters or cleaners 33 are mounted upon the shafts 31 and 32 adjacent to the upper and under sides of the braces 29. These cleaners consist of circular disks having short radially-extending flanges or teeth, one object of which is to keep the conveyer-chains clean and prevent choking, as will be hereinafter described. Another object of these toothed disks is to force the ears of corn into the slots or recesses of the shelves, whereby they are straightened out to an approximately horizontal position and guided between said shelves. Said cleaners upon the shaft 31 are arranged opposite to the inner ends of the short slots 6 in the shelves of section 1, while the cleaners upon the rear shaft 32 are opposed to the inner ends of the long slots 7. It will be seen that the slots 6 and 7 being arranged in alternating shelves 5, the cleaners 33 will be arranged in alternate order upon the shafts 31 and 32 and in pairs adjacent to the upper and under sides of the braces 29.

The front and rear uprights 27 and 28 of the section 2 are provided with brackets or bearings for shafts 35 and 36, the latter of which is provided at its lower end with a pinion 37, meshing with a bevel-gear 38 upon the rear end of a shaft 39, which is mounted in suitable bearings upon the under side of the section 2. The shaft 29 is provided with a bevel-gear 40, by means of which it is driven from one of the supporting-wheels of the machine. The shafts 35 and 36 are to be provided with sprocket-wheels 42ª, over which pass the conveyer-chains 43, motion being imparted to the said shafts through the medium of the counter-shaft 39. The chains 43 serve in conjunction with the chains 22, already described, to guide the cornstalks between the sections of the device and in the direction of the cutting mechanism.

The braces 29 of the section 2 are provided near their rear ends with bearings for two vertical shafts 47 and 48, the former of which carries a series of fan-shaped wings or beaters 49, arranged between the braces 29. The rearmost shaft 48 carries a series of rollers 50, which are to be of such diameter that the edges of the wings 49 shall barely touch them when the device is in operation. It will be understood that the wings or beaters 49 are to have rigid attachment upon the shaft 47, while the rollers 50 may be loose upon the shaft 48. The rollers 50 may, however, be firmly attached upon the shaft when desired, so as to receive a rotary motion therewith. The lower ends of the shafts 47 and 48 have pinions 51 meshing with bevel-gears 52 upon the counter-shaft 39, from which motion is thus transmitted to the said shafts.

It will be observed that the rollers 50 are arranged closely contiguous to the cutting apparatus at the rear end of the section 1, the object of said rollers being to hold the stalks up close against the cutter-bar while the ears are being severed. The wings or beaters 49 serve to force the butts of the ears in an outward direction, so that they shall be presented to the cutting apparatus in the most desirable position.

In operation the sections 1 and 2 are to be connected with the frame of the machine of which they are to form a portion in such a manner as to be suitably spaced apart, so as to permit the passage between them of the stalks of corn standing in the field and which are to be operated upon. As the machine passes over the field the cornstalks will enter or be guided by the guides G between the said sections and in such a manner as to be subjected to the action of the conveyer-chains, which are arranged horizontally upon both sections in the manner and in the locations already described. The ears will be guided or will naturally drop into the recesses 6 and 7 of the horizontal shelves of the section 1 of the machine, and when they reach the inner ends of said recesses they will be naturally guided to a horizontal position upon the said shelves, where they are supported until they reach the cutting apparatus. Short, broken, and uneven stalks will be prevented by the springs 12 and 13 from entering into the recesses and all stalks will be engaged by the beaters or clearers 33, which are arranged contiguous to the upper and under sides of the shelves, so as to prevent the said stalks from becoming entangled at the ends of said recesses and from clogging the conveyer-chains. The importance of making the recesses 6 and 7 of unequal lengths or, rather, alternately long and short in the alternate shelves will here be apparent, inasmuch as provision is thereby made for operating upon stalks of all lengths, stalks that are very short being prevented from entering the recesses as well as those from which the tops may have been broken. The importance of preventing the stalks from entering the said recesses will also be understood, because in the event of their doing so they will be dragged under the shelves and seriously interfere with the progress of the machine or even arresting the progress until they could be cleared out by hand. As the machine progresses over the field the ears will come under the influence of the wings or beaters 49, whereby the points of the ears are thrown in a forward direction between the shelves of the section 1, the butt-ends of the ears being presented to the rollers 50 and held by the said rollers in contact with the cutting mechanism, which will thus unfailingly sever the ears from the stalks without injury to the corn. Suitable means are to be provided for the reception of the ears and for the conveyance thereof to the husking mechanism; but this is no part of my present invention and has not been illustrated in the drawings. The stalks will escape at the rear end of the device in a comparatively uninjured condition.

It may be stated that when the corn is dry a large number of the ears will have been snapped or broken off before reaching the cutting mechanism; but the latter will operate unfailingly upon such ears as remain and no part of the corn will be permitted to escape or to go to waste.

Having thus described my invention, I claim and desire to secure by Letters Patent of the United States—

1. In an ear-stripping device for corn-harvesters a guiding-frame having horizontally-disposed shelves in combination with a conveyer-frame arranged approximately parallel to said guiding-frame, the shelves of said guiding-frame being provided with means whereby the ears shall be guided between said shelves, substantially as set forth.

2. In a device of the class described, the combination of a guiding-frame having horizontally-disposed shelves, and cutting mechanism arranged vertically at the rear end of said frame, the shelves being provided with means whereby the ears of corn shall be guided between said shelves, substantially as set forth.

3. The guiding-frame having horizontally-disposed shelves provided with slots in their inner edges in combination with springs extending over said slots and having their rear ends free to enter said slots, the conveyer-frame, and means for guiding the stalks between said guiding and conveyer frames, substantially as set forth.

4. The combination of the guiding-frame having horizontally-disposed shelves provided with slots in their inner edges, brackets extending from the front upright of the frame in a rearward direction in said slots, links connecting the inner ends of said brackets with the shelves and providing for a space between said brackets and shelves, and endless conveyer-chains arranged upon sprockets at the inner ends of said brackets and upon a vertical shaft mounted in bearings upon the front side of the frame, substantially as set forth.

5. The combination of the guiding-frame having horizontally-disposed shelves provided with recesses in their inner edges extending rearwardly from the front of said shelves, said recesses being of varying lengths, the conveyer-section having braces which are recessed or beveled for distances corresponding with the lengths of the recesses in the shelves of the guiding-frame, shafts mounted in said braces approximately opposite to the inner ends of the recesses in the shelves of the guiding-sections, clearing-disks upon said shafts, arranged contiguous to the upper and under sides of the braces and shelves, endless conveyer-chains passing over sprocket-wheels upon shafts mounted vertically upon the front and rear sides of the conveyer-frame, and operating means, substantially as set forth.

6. In a machine of the class described, the combination with guiding-shelves having recesses formed therein, of braces alining with said shelves, rotary clearers arranged contiguous to the upper and under sides of said braces at the inner ends of said recesses, endless conveyers, and operating mechanism, substantially as set forth.

7. In a machine of the class described, the combination with guiding-shelves having recesses formed therein, and springs arranged contiguous to said recesses and having their rear ends free to enter the latter, of braces opposite to and in the same horizontal plane as said shelves, rotary beaters arranged contiguous to the upper and under sides of said braces at the inner ends of said recesses, endless conveyers, and operating mechanism, substantially as set forth.

8. In a machine of the class described, the combination of horizontally-arranged guiding-shelves having recesses formed therein, said recesses being alternately of unequal lengths in alternate shelves, springs arranged contiguous to said recesses and having their rear ends free to enter the latter, braces alining with said shelves, rotary beaters arranged contiguous to the upper and under sides of said braces at the inner ends of said recesses, endless conveyers, and operating mechanism, substantially as set forth.

9. In a machine of the class described, an ear supporting and guiding device consisting essentially of a horizontally-disposed shelf having a recess formed therein in front of its rear end to receive the ear of corn which is guided by said shelf to an approximately horizontal position, in combination with a brace disposed opposite to and in the same horizontal plane as said shelf, substantially as described.

10. The combination with a horizontally-disposed guiding-shelf having a recess formed therein, of a spring arranged contiguous to said recess and having one end free to enter the latter, substantially as set forth.

11. The combination with a guiding-shelf having an ear-receiving recess, of a guard-spring disposed contiguous to said recess to keep stalks from entering the same, substantially as set forth.

12. The combination of a horizontally-disposed shelf having an ear-receiving recess, a guard-spring disposed contiguous to said recess, rotary clearers arranged contiguous to the upper and under sides of the supporting-shelf, endless conveyers, and operating mechanism, substantially as set forth.

13. In a machine of the class described, a series of horizontally-disposed guiding and supporting shelves having ear-receiving recesses formed therein, said recesses being of unequal lengths to provide for stalks of uneven lengths, in combination with clearing-disks disposed adjacent to the ends of said recesses and contiguous to the upper and under sides of the shelves, and endless conveyers, substantially as set forth.

14. The combination of the guiding-frame and the conveyer-frame, spaced apart and provided respectively with horizontally-disposed shelves and with braces opposite to and in the same horizontal plane as said shelves, the endless conveyer-chains, means for operating the same, the cutting apparatus carried by the guiding-frame, shafts journaled vertically in the conveyer-frame and carrying respectively beaters and rollers arranged to present the butts of the ears to the cutting apparatus, and operating means, substantially as set forth.

15. In a device of the class described, the combination of the guiding-frame having horizontally-disposed shelves, recesses in said shelves, springs extending over said recesses and having free inner ends, the conveyer-frame spaced apart from the guiding-frame and having horizontally-disposed braces beveled to correspond with the recesses in the shelves in the guiding-frame, the horizontally-disposed endless conveyer-chains, the cutting apparatus at the rear end of the guiding-frame, beaters and rollers arranged between the braces of the conveyer-section, and suitable operating means, substantially as set forth.

In testimony that I claim the foregoing as my own I have hereto affixed my signature in the presence of two witnesses.

JOHN PIERCE LAMASNEY.

Witnesses:
A. G. CARPENTER,
E. O. OWEN.